(12) United States Patent
Shogren (10) Patent No.: US 10,458,542 B2
(45) Date of Patent: Oct. 29, 2019

(54) BRAKE TRANSMISSION SHIFT INTERFACE PIN ASSEMBLY

(71) Applicants: THYSSENKRUPP PRESTA AG, Eschen (LI); THYSSENKRUPP AG, Essen (DE)

(72) Inventor: Mark Shogren, Westfield, IN (US)

(73) Assignees: ThyssenKrupp Presta AG, Eschen (LI); thyssenkrupp AG, Essen (DE)

( * ) Notice: Subject to any disclaimer, the term of this patent is extended or adjusted under 35 U.S.C. 154(b) by 377 days.

(21) Appl. No.: 15/425,267

(22) Filed: Feb. 6, 2017

(65) Prior Publication Data

US 2018/0223990 A1 Aug. 9, 2018

(51) Int. Cl.
  *F16H 61/22* (2006.01)
  *F16H 59/10* (2006.01)
  *B60K 20/06* (2006.01)

(52) U.S. Cl.
  CPC ........... *F16H 61/22* (2013.01); *F16H 59/105* (2013.01); *B60K 20/06* (2013.01); *B60Y 2306/09* (2013.01); *B60Y 2400/414* (2013.01); *B60Y 2410/10* (2013.01); *F16H 2061/223* (2013.01)

(58) Field of Classification Search
  CPC .. F16H 61/22; F16H 59/105; F16H 2061/223; B60K 20/06; B60Y 2306/09; B60Y 2400/414; B60Y 2410/10
  See application file for complete search history.

(56) References Cited

U.S. PATENT DOCUMENTS

| | | | | |
|---|---|---|---|---|
| 5,176,231 A | * | 1/1993 | Moody | F16H 61/22 192/220.2 |
| 5,402,870 A | * | 4/1995 | Osborn | F16H 59/10 192/220.7 |
| 5,759,132 A | | 6/1998 | Osborn et al. | |
| 5,825,270 A | * | 10/1998 | Hattori | F16H 61/22 335/223 |
| 5,853,348 A | | 12/1998 | Lehman | |
| 6,082,216 A | | 7/2000 | Watanabe et al. | |
| 6,899,213 B1 | * | 5/2005 | Lohss | F16H 59/10 192/220.3 |
| 7,845,252 B2 | | 12/2010 | Vermeersch | |

(Continued)

FOREIGN PATENT DOCUMENTS

EP 0437985 B1 8/1994

*Primary Examiner* — Zakaria Elahmadi
(74) *Attorney, Agent, or Firm* — RMCK Law Group PLC (57) ABSTRACT

A shifter system assembly for a steering column constructed in accordance to one example of the present disclosure includes a shifter mechanism and a brake transmission shift interface (BTSI). The shifter mechanism receives a shift lever and selectively moves between a "Park" position and an out of "Park" position. The BTSI assembly comprises a BTSI pin assembly and a solenoid coil. The BTSI pin assembly includes a blocking pin, a solenoid pin and a coupler. The solenoid pin is separate and distinct from the blocking pin. The coupler couples the blocking pin and the solenoid pin. The BTSI pin assembly moves between an extended position and a retracted position. In the extended position the blocking pin inhibits movement of the shifter mechanism out of the "Park" position. In the retracted position, the blocking pin allows movement of the shifter mechanism to the out of "Park" position.

20 Claims, 6 Drawing Sheets

(56) References Cited

U.S. PATENT DOCUMENTS

| | | |
|---|---|---|
| 8,113,081 B2 | 2/2012 | Reppuhn et al. |
| 8,366,149 B2 | 2/2013 | Huber |
| 8,602,194 B2 † | 12/2013 | Vermeersch |
| 8,991,863 B2 | 3/2015 | Hahn et al. |
| 9,090,284 B2 | 7/2015 | Meyer et al. |
| 9,360,108 B2 † | 6/2016 | Pfenninger |
| 2003/0195082 A1 | 10/2003 | Kalia |
| 2003/0213673 A1* | 11/2003 | Burr ................... F16H 59/105 192/220.2 |
| 2006/0053931 A1* | 3/2006 | Bye ..................... F16H 61/22 74/473.21 |
| 2010/0031769 A1* | 2/2010 | Avers ................... F16H 61/22 74/529 |
| 2014/0095028 A1* | 4/2014 | Pfenninger ............ F16H 61/22 701/48 |
| 2015/0000451 A1* | 1/2015 | Yamamoto .......... F16H 59/0204 74/473.24 |
| 2015/0314801 A1 | 11/2015 | Hausknecht et al. |
| 2015/0362067 A1* | 12/2015 | Mitteer ................ F16H 61/22 74/490.07 |
| 2017/0133138 A1* | 5/2017 | Bye .................... F16H 61/0204 |
| 2017/0335957 A1* | 11/2017 | Abu-Soud .............. F16H 61/22 |

\* cited by examiner
† cited by third party

BRAKE TRANSMISSION SHIFT INTERFACE PIN ASSEMBLY

FIELD

The present disclosure relates generally to a steering column shifter and more specifically to a brake transmission shift interface (BTSI) pin assembly that incorporates a separate and distinct blocking pin and solenoid pin.

BACKGROUND

Motor vehicles having automatic transmissions typically include shifter levers mounted on a steering column or on a center console. Shifter levers are generally provided as part of a steering column assembly that further includes a brake transmission shift interface (BTSI) feature. In general, the BTSI feature precludes an operator from moving the shift lever out of a park position unless an ignition switch is in an "ON" position and a brake pedal is depressed. Many steering column assemblies further include a park lock feature that precludes movement of the shift lever from the park position unless an ignition switch is in the "ON" position.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A shifter system assembly for a steering column constructed in accordance to one example of the present disclosure includes a shifter mechanism and a brake transmission shift interface (BTSI). The shifter mechanism receives a shift lever and selectively moves between a "Park" position and an out of "Park" position. The BTSI assembly comprises a BTSI pin assembly and a solenoid coil. The BTSI pin assembly includes a blocking pin, a solenoid pin and a coupler. The solenoid pin is separate and distinct from the blocking pin. The coupler couples the blocking pin and the solenoid pin. The BTSI pin assembly moves between an extended position and a retracted position. In the extended position the blocking pin inhibits movement of the shifter mechanism out of the "Park" position. In the retracted position, the blocking pin allows movement of the shifter mechanism to the out of "Park" position.

According to other features of the present disclosure, the shifter system assembly includes a detent plate. The blocking pin locates between the detent plate and a protrusion extending from the shifter mechanism. The blocking pin and the detent plate are configured to resist load from the shifter mechanism when the blocking pin is in the extended position. The shifter system assembly further includes a BTSI pin carrier that defines a first inner diameter that accommodates the blocking pin. The BTSI pin carrier further defines a second inner diameter that accommodates the coupler. The BTSI pin carrier includes a first radial engagement wall at a transition between the first and second inner diameters.

According to additional features, the second inner diameter is greater than the first inner diameter. The coupler includes a coupler body having an outer diameter greater than corresponding diameters of the blocking pin and the solenoid pin. The coupler engages the first radial engagement wall when the blocking pin is in the extended position. The coupler is comprised of elastomeric material. The coupler provides sound deadening upon engagement of the coupler with the first radial engagement wall.

In other features the shifter system assembly further comprises a solenoid coil housing that houses the solenoid and includes a second radial engagement wall that diametrically opposes the first radial engagement wall. The coupler provides sound deadening upon engagement of the coupler with the second radial engagement wall. The BTSI pin assembly moves between the extended position when the solenoid is de-energized and the retracted position when the solenoid is energized. In the retracted position, the coupler engages the second radial engagement wall such that a gap is defined between a distal end of the solenoid pin and the solenoid coil housing.

According to still other features, the blocking pin extends along a blocking pin axis. The solenoid pin extends along a solenoid pin axis. The coupler allows the pin assembly to successfully translate between the extended position and the retracted positions despite the blocking pin and the solenoid pin axes occupying a misaligned, non-coaxial position. Both of the blocking pin and the solenoid pin include a respective conical extension portion that mates with the coupler. The body defines a first female receiving cavity and a second female receiving cavity. The first female receiving cavity receives the conical extension portion of the blocking pin. The second female receiving cavity receives the conical extension portion of the solenoid pin. The blocking pin is formed of hardened metallic material. The solenoid pin is formed of non-hardened magnetic material.

A shifter system assembly for a steering column constructed in accordance to another example of the present disclosure includes a shifter mechanism and a brake transmission shift interface (BTSI). The shifter mechanism receives a shift lever and selectively moves between a "Park" position and an out of "Park" position. The BTSI assembly comprises a BTSI pin assembly and a solenoid coil. The BTSI pin assembly is at least partially received by a BTSI housing portion. The BTSI pin assembly includes a blocking pin, a solenoid pin and an elastomeric coupler. The solenoid pin is separate and distinct from the blocking pin. The coupler couples the blocking pin and the solenoid pin. The BTSI pin assembly moves between an extended position and a retracted position. In the extended position the blocking pin inhibits movement of the shifter mechanism out of the "Park" position. In the retracted position, the blocking pin allows movement of the shifter mechanism to the out of "Park" position. The elastomeric coupler engages the BTSI housing portion in the extended and retracted positions providing a controlled soft impact surface and facilitating sound deadening properties.

BRIEF DESCRIPTION OF THE DRAWINGS

The present disclosure will become more fully understood from the detailed description and the accompanying drawings, wherein.

DETAILED DESCRIPTION

Figure 1:
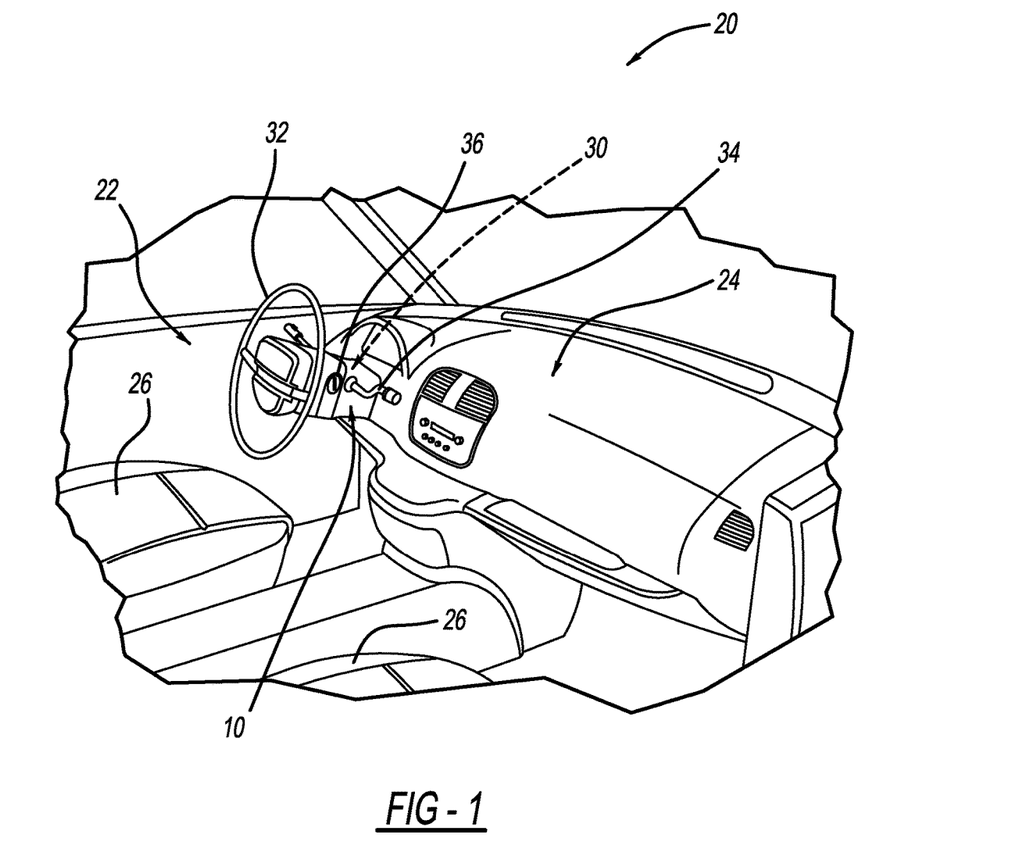
FIG. 1 is partial perspective view of an exemplary vehicle cabin having a steering column assembly constructed in accordance to one example of the present disclosure.

With initial reference to FIG. 1, a steering column assembly constructed in accordance to one example of the present teachings is shown and generally identified at reference numeral 10. The steering column assembly 10 is shown in an exemplary vehicle 20 having a vehicle cabin 22 that includes a dash 24 and vehicle seats 26. The steering column assembly 10 includes a shifter system assembly 30 explained in greater detail herein. The steering column assembly 10 supports a steering wheel 32 and further includes a shift lever 34 and an ignition switch 36. For purposes of the following discussion, the shift lever 34 can be moved to select a number of operating positions including, but not limited to, "Park", "Reverse", "Neutral", "Drive", "Second" and "First" positions. An ignition key can be inserted into the ignition switch 36. The ignition switch can be rotated to a number of positions including, but not limited to, "Accessory", "Lock", "Off", "Run" and "Start" positions. As is conventional, the ignition key is permitted to be inserted into and removed from the ignition switch 36 when the ignition switch 36 is in the "Lock" position. It is appreciated that the configuration of the vehicle 20 shown in FIG. 1 including the shift lever 34 and ignition switch 36 is merely exemplary. In this regard, the steering column assembly 10 may be incorporated as part of other vehicle arrangements and models having different styles within the scope of the present disclosure.

Figure 2:
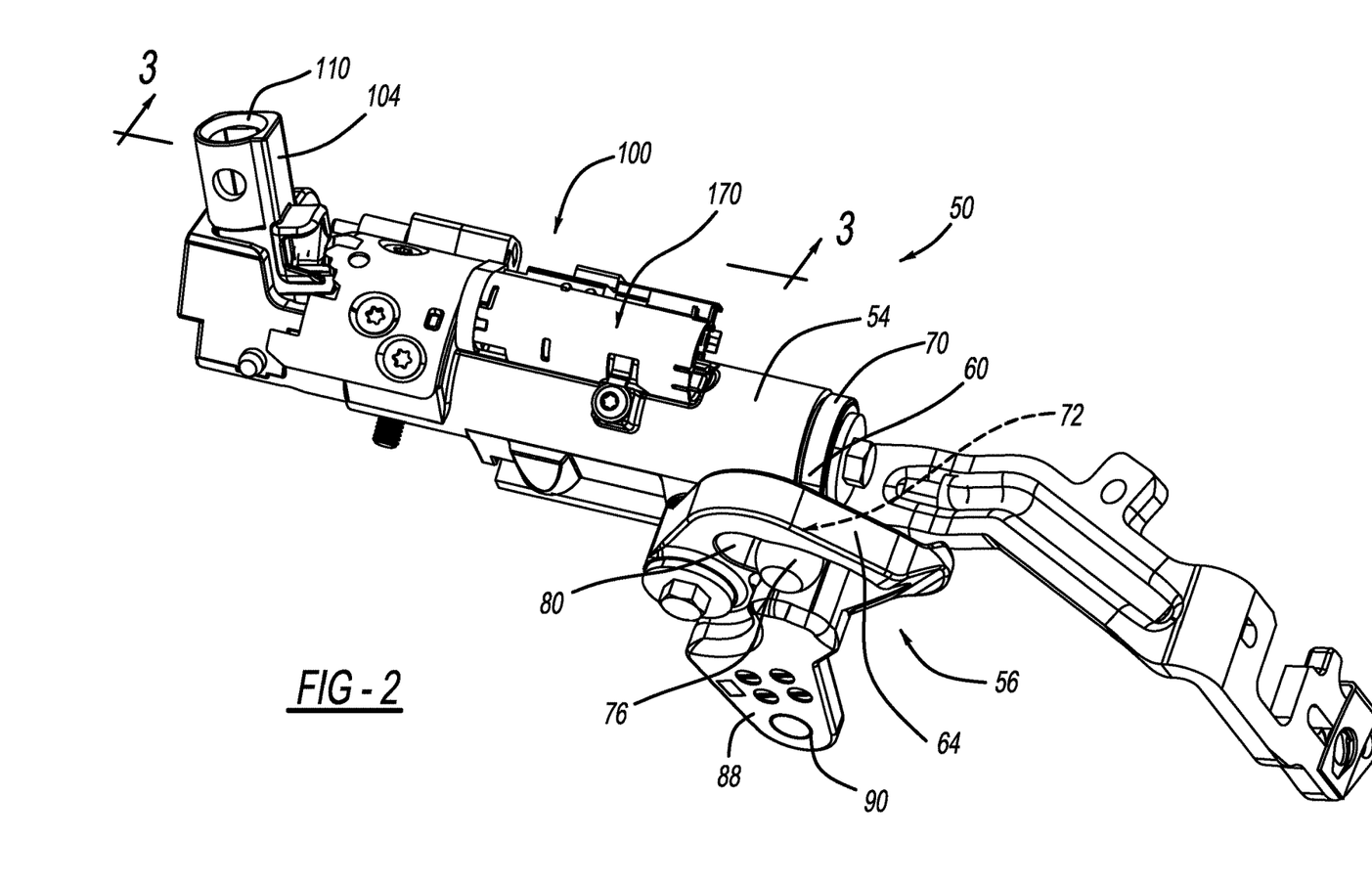
FIG. 2 perspective view of a shifter system assembly constructed in accordance to one example of the present disclosure.

Turning now to FIG. 2, a shifter system assembly 50 constructed in accordance to one example of prior art will be described. The shifter system assembly 50 includes a stationary housing 54 that can be fixedly mounted to the vehicle 20 within a steering column assembly. The shifter system assembly 50 includes a cam assembly 56 including a cam actuator lever 60 and a cam receiver 64. The cam actuator lever 60 is rotated by a shaft 66 (FIG. 3) disposed within the stationary housing 54. The cam actuator lever 60 has a proximal end 70 that is configured to be mounted to the shaft 66 and a distal end 72 that supports a ball 76. The cam receiver 64 defines an arcuate slot 80 that receives the ball 76. The cam receiver 64 can include a crank member 88. The crank member 88 can include a mounting point 90 configured to receive a mechanical push-pull cable that connects the crank member 88 to the transmission.

The housing 54 supports a brake transmission shift interlock (BTSI) assembly 100 and a clevis or shifter mechanism 104. The shifter mechanism 104 is connected to the shaft 66 and has a socket 110 that receives a shift lever (such as shift lever 34, FIG. 1). In this regard, rotation of the shifter mechanism 104 causes rotation of the shaft 66 ultimately causing movement of the crank member 88 from interaction of the cam assembly 56.

In general, the BTSI assembly 100 precludes an operator from moving the shift lever 34 out of a "Park" position unless an ignition switch is in an "ON" position and a brake pedal is depressed. The BTSI system 100 according to the present disclosure comprises a BTSI pin assembly 110 and a solenoid coil 114. The BTSI pin assembly 110 includes a blocking pin 120, a solenoid pin 122 and a coupler 124 that couples the blocking pin 120 and the solenoid pin 122. The solenoid pin 122 is separate and distinct from the blocking pin 120.

The configuration of the BTSI pin assembly 110 provides advantages over conventional one-piece arrangements. For example, the blocking pin 120 and the solenoid pin 122 may be misaligned relative to each other without compromising the operation of the BTSI system 100. Explained further, the blocking pin 120 extends along a longitudinal blocking pin axis 130. Similarly, the solenoid pin 122 extends along a longitudinal solenoid pin axis 132. The coupler 124 is formed of an elastomeric material such as rubber. In some examples, the longitudinal blocking pin axis 130 and the longitudinal solenoid pin axis 132 may not be coaxial. Nevertheless, the arrangement of the BTSI assembly 100 of the present disclosure, including the two-piece pin and coupler allows for proper operation despite misalignment of the axes 130, 132.

The blocking pin 120 extends generally along a blocking pin body 140 between a distal end 142 and a proximal end 144. As will be explained herein, when the BTSI pin assembly 110 is in an extended position (FIGS. 3 and 4), the distal end 142 blocks rotation of the shifter mechanism 104 by resisting load against a detent plate 148. The proximal end 144 can include a conical extension portion 146 that mates with the coupler 124. The solenoid pin 122 extends generally along a solenoid pin body 150 between a distal end 152 and a proximal end 154. The proximal end 154 can include a conical extension portion 156 that mates with the coupler 124. The coupler 124 can include a coupler body 160 that defines a first female receiving cavity 162 that receives the conical extension portion 146 of the blocking pin 120 and a second female receiving cavity 164 that receives the conical extension 156 of the solenoid pin 122. The coupler body 160 defines an outer diameter that is greater than corresponding diameters of the blocking pin 120 and the solenoid pin 122.

Figure 3:
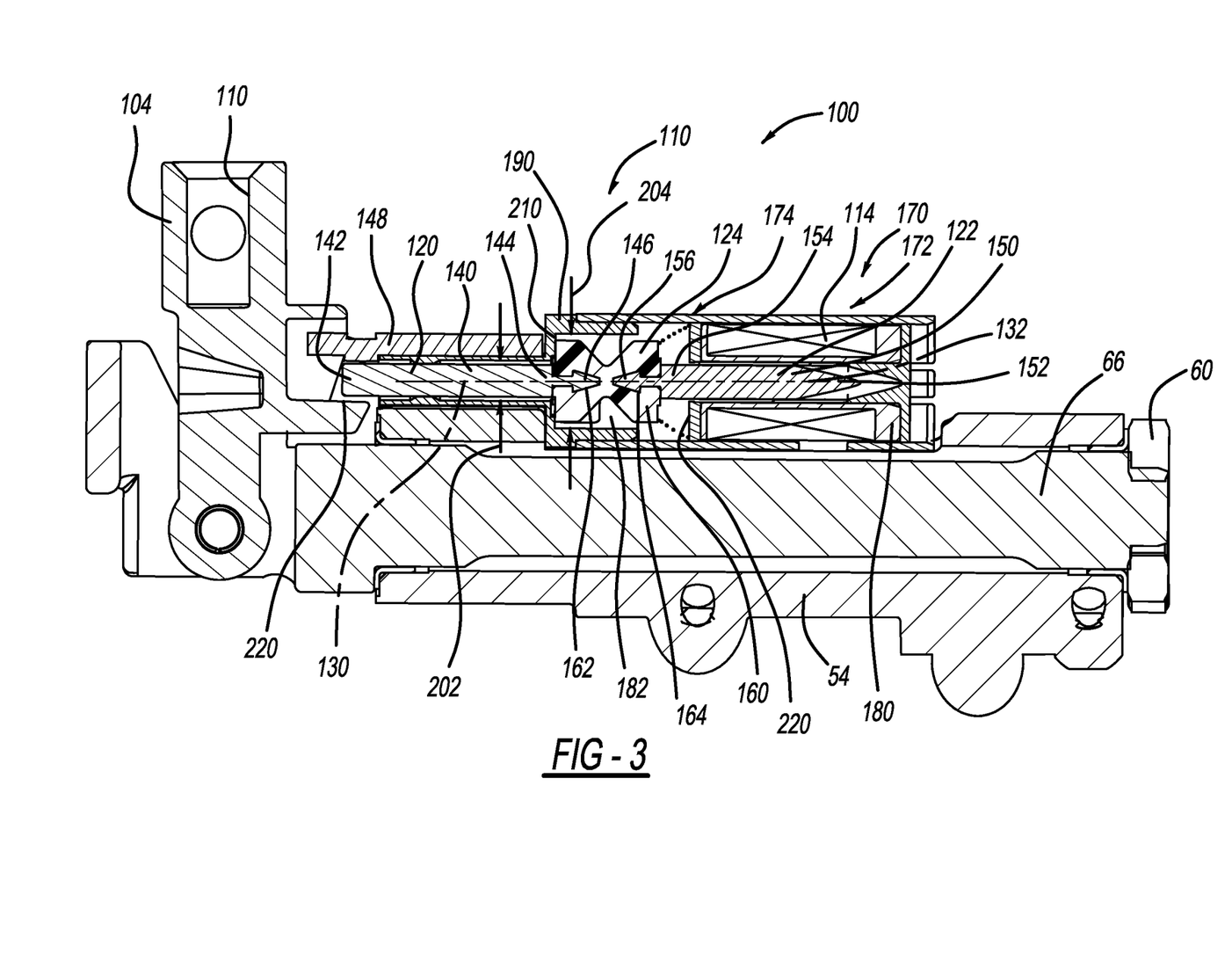
FIG. 3 is a partial sectional view of a BTSI assembly of the shifter system assembly taken along lines 3-3 of FIG. 2 and including a BTSI pin assembly having a blocking pin an d a distinct solenoid pin, the BTSI assembly shown with a solenoid de-energized corresponding to the vehicle being in a "Park" position.

With reference to FIG. 3, the BTSI assembly 100 further includes a BTSI housing portion 170 that includes a solenoid housing portion 172 and a coupler housing portion 174. The solenoid housing portion 172 defines a first cavity 180 that houses the solenoid coil 114. The coupler housing portion 174 defines a second cavity 182 that houses the coupler 124. The coupler housing portion 174 can be partially comprised of a BTSI pin carrier 190. The BTSI pin carrier 190 defines a first inner diameter 202 that accommodates the blocking pin 120 and a second inner diameter 204 that accommodates the coupler 124. The BTSI pin carrier 190 further includes a first radial engagement wall 210 at a transition between the first and second inner diameters 202 and 204. As discussed herein, the coupler 124 engages the first radial engagement wall 210 when the BTSI pin assembly 110 is in an extended position providing a controlled soft impact surface. As the coupler 124 is formed of elastomeric material, the coupler 124 provides sound deadening upon engagement of the coupler 124 with the first radial engagement wall 210.

Operation of the BTSI assembly 100 will now be described. The BTSI pin assembly 110 moves between an extended position (FIGS. 3 and 4) corresponding to the solenoid 122 not being energized (deactivated) and a retracted position (FIGS. 5 and 6) corresponding to the solenoid 122 being energized (activated). In the extended position, the blocking pin 120 inhibits movement of the shifter mechanism 104 out of the "Park" position. Explained further, with particular reference to FIG. 4, the distal end 142 of the blocking pin 120 engages a protrusion 220 of the shifter mechanism 104 and therefore inhibits further rotation (in a counter-clockwise direction) of the shifter mechanism 104. In some instances the impact of the protrusion 220 onto the blocking pin 120 may cause the blocking pin 120 to move (distal end 142 may move generally upward as viewed in FIG. 4). The coupler 124 allows the axis 130 of the blocking pin 120 to be misaligned (non-coaxial) with the axis 132 of the solenoid pin 132. The misalignment can be temporary.

Figure 5:
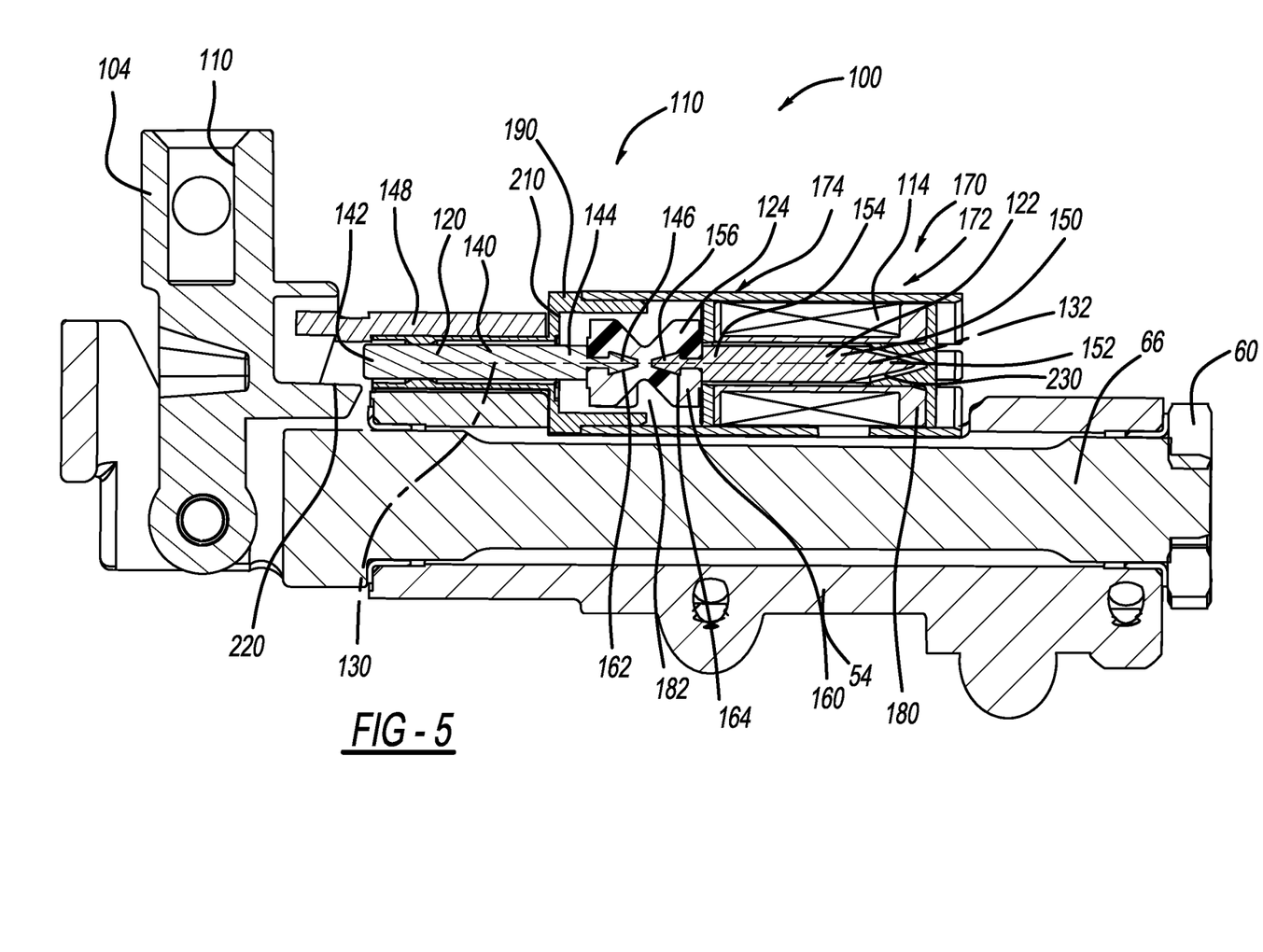
FIG. 5 is a partial sectional view of the BTSI assembly of FIG. 4 and shown with the solenoid energized upon pressing of a brake pedal whereby the blocking pin is translated away from interfering with the clevis.
Figure 6:
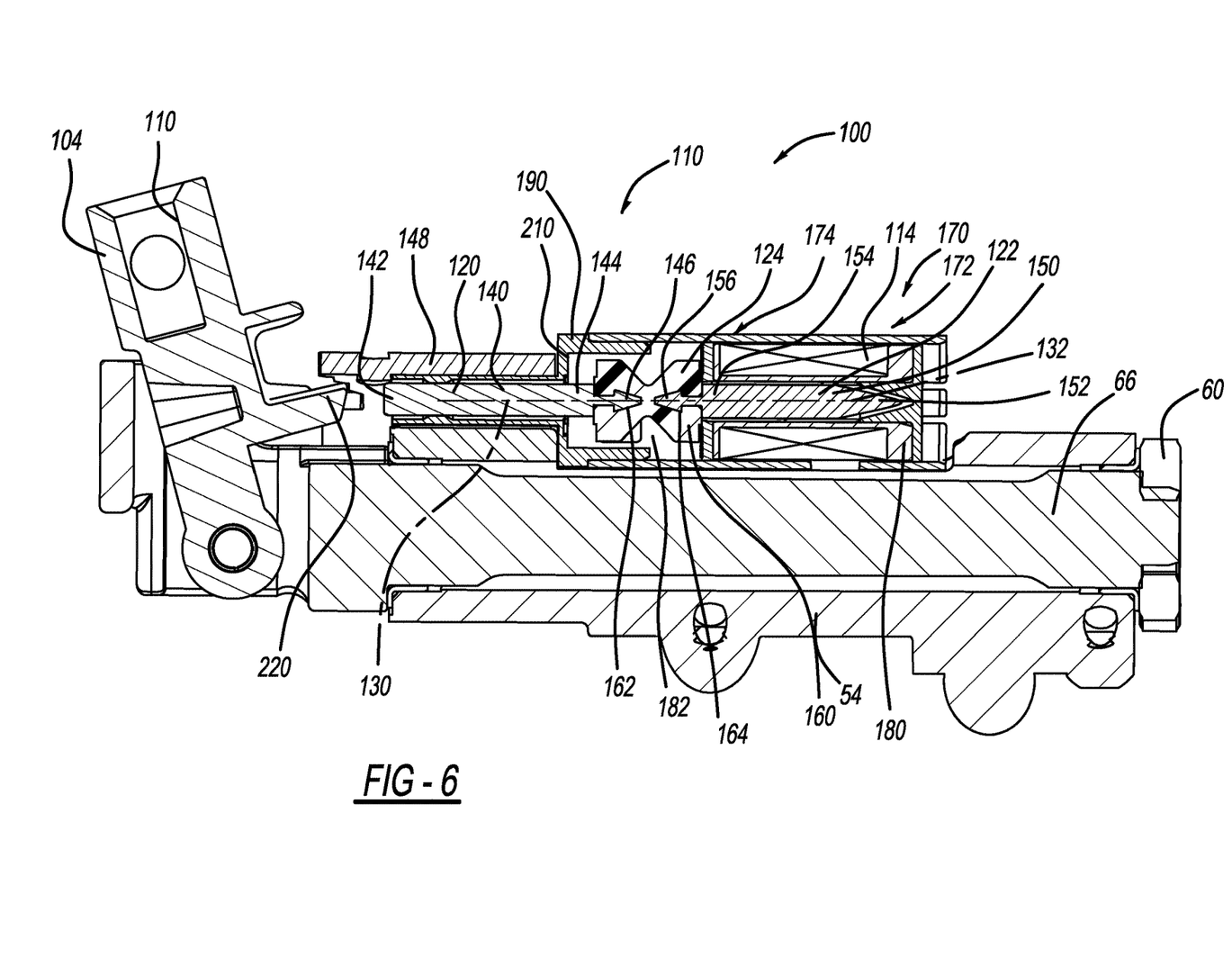
FIG. 6 is a partial sectional view of the BTSI assembly of FIG. 5 and shown with the solenoid energized and the clevis rotating out of the "Park" position.

In the retracted position, the blocking pin 120 translates rightward from the position shown in FIG. 3 to the position shown in FIG. 5 upon energizing of the solenoid 122. Notably, the coupler 124 engages an engagement wall 226 of the BTSI housing portion 170 providing a controlled soft impact surface resulting in sound deadening. In this regard, the coupler 124 engages the BTSI housing portion 170 prior to the distal end 152 of the solenoid pin 150 bottoming out in the solenoid housing portion 172. A gap 230 is defined between the distal end 152 of the solenoid pin 150 and the solenoid housing portion 172.

In some prior art examples that may employ a unitary pin, the unitary pin could permanently deform due to a user attempting to move the shifting mechanism 104 out of the "Park" position while the pin is in the extended position and attempting to preclude such motion. Once deformed, the pin is more susceptible to binding up during translation between the extended and retracted position when not properly aligned with the solenoid coil 114. Moreover, the unitary pin could have a tendency to deform the BTSI housing portion 170 as a result of a user attempting to move the shifting mechanism 104 out of the "Park" position while the pin is in the extended position.

Figure 4:
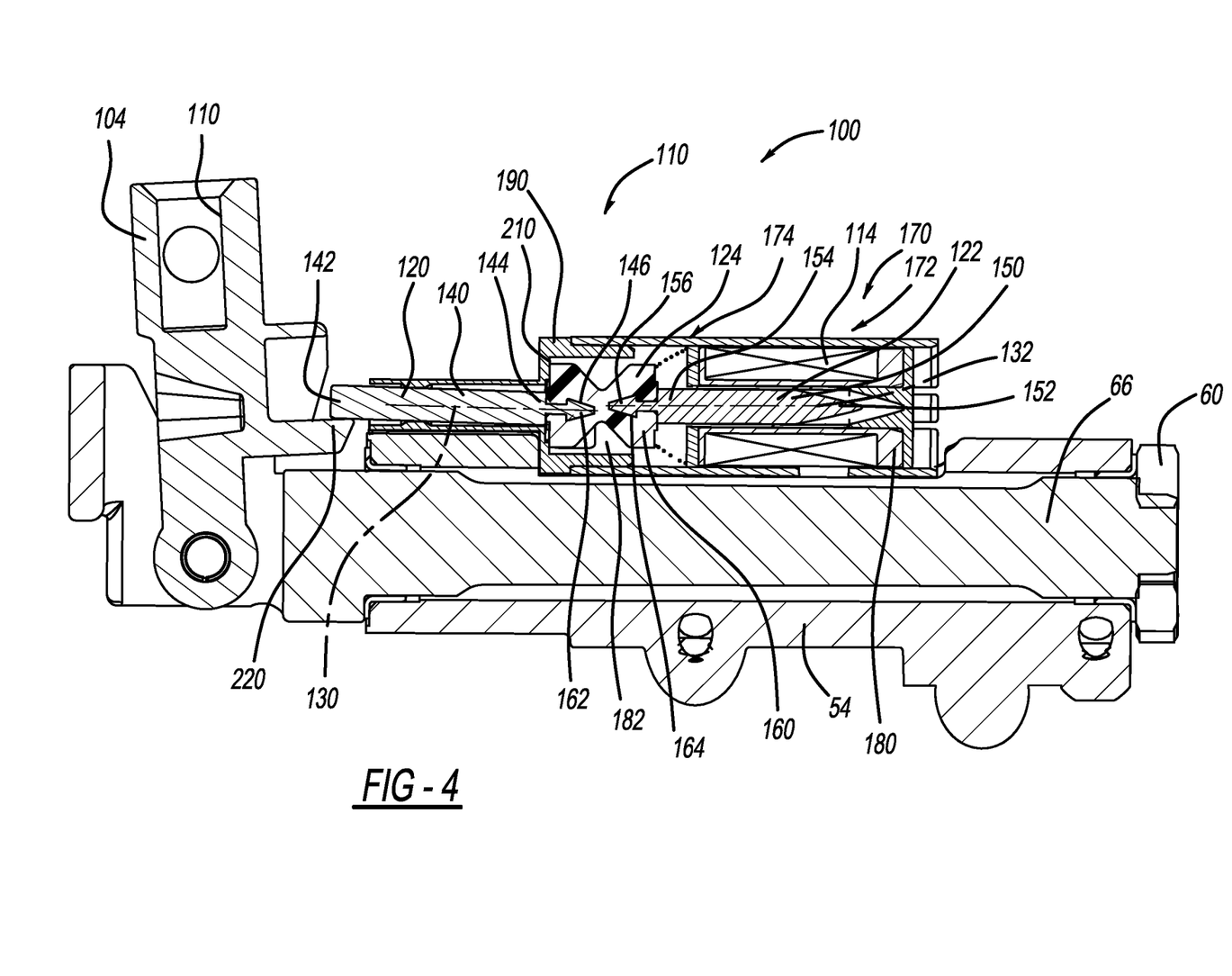
FIG. 4 is a partial sectional view of the BTSI assembly of FIG. 3 and shown with the solenoid de-energized and the blocking pin inhibiting rotation of a clevis from the "Park" position, the BTSI pin assembly allowing for temporary axial misalignment of the locking pin and the solenoid pin.

The present BTSI pin assembly 110 of the present disclosure successfully decouples the blocking pin 120 (doing the locking) from the solenoid pin 122 (responsible for initiating translation). In this regard, the blocking pin 120 can be loaded without compromising the position and integrity of the solenoid pin 122. Explained further, and as shown in FIG. 4, the blocking pin 120 can rotate generally clockwise upon urging from the protrusion 220 while the solenoid pin 122 remains substantially fixed due to the compliant coupler 124 accommodating relative movement. The compliant nature of the coupler 124 tends to return the blocking pin 120 and the solenoid pin 122 back to a coaxial relationship. In this way, permanent deformation of the BTSI pin assembly 110 is discouraged.

In other advantages, the blocking pin 120 and the solenoid pin 122 are formed of distinct materials. The blocking pin 120 is formed of a hardened material that resists deformation when loaded and inhibits premature wearing. The hardened material can include a hardened metal material. In other examples the blocking pin 120 can be formed of other rigid materials such as titanium. The solenoid pin 122 does not need to be hardened, as it is not accommodating any loading. The solenoid pin is formed of magnetic material such as steel. The present design therefore allows for flexibility to assign materials that optimize performance and cost.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. In this regard, the ordering of method steps is not necessarily fixed, but may be capable of being modified without departing from the instant teachings. Such variations are not to be regarded as a departure from the disclosure, and all such modifications are intended to be included within the scope of the disclosure.

What is claimed is:

1. A shifter system assembly for a steering column, the shifter system assembly comprising:
   a shifter mechanism that receives a shift lever, the shifter mechanism selectively movable between a "Park" position and an out of "Park" position;
   a brake transmission shift interface (BTSI) assembly comprising:
      a BTSI pin assembly comprising:
         a blocking pin;
         a solenoid pin that is separate and distinct from the blocking pin; and
         a coupler that couples the blocking pin and the solenoid pin wherein the coupler includes a coupler body having an outer diameter greater than corresponding diameters of the blocking pin and the solenoid pin; and
      a solenoid coil, wherein the BTSI pin assembly moves between an extended position and a retracted position, wherein (i) in the extended position, the blocking pin inhibits movement of the shifter mechanism out of the "Park" position and (ii) in the retracted position, the blocking pin allows movement of the shifter mechanism to the out of "Park" position.

2. The shifter system assembly of claim 1, further comprising a detent plate, wherein the blocking pin locates between the detent plate and a protrusion extending from the shifter mechanism, the blocking pin and detent plate configured to resist load from the shifter mechanism when the blocking pin is in the extended position.

3. The shifter system assembly of claim 1, further comprising a BTSI pin carrier that defines a first inner diameter that accommodates the blocking pin.

4. The shifter system assembly of claim 3 wherein the BTSI pin carrier further defines a second inner diameter that accommodates the coupler, wherein the BTSI pin carrier includes a first radial engagement wall at a transition between the first and second inner diameters.

5. The shifter system assembly of claim 4 wherein the second inner diameter is greater than the first inner diameter.

6. The shifter system assembly of claim 1 wherein the coupler engages the first radial engagement wall when the blocking pin is in the extended position.

7. The shifter system assembly of claim 6 wherein the coupler is comprised of an elastomeric material.

8. The shifter system assembly of claim 7 wherein the coupler provides sound deadening upon engagement of the coupler with the first radial engagement wall.

9. The shifter system assembly of claim 7, further comprising a solenoid coil housing that houses the solenoid and includes a second radial engagement wall that diametrically opposes the first radial engagement wall, wherein the coupler provides sound deadening upon engagement of the coupler with the second radial engagement wall.

10. The shifter system assembly of claim 9 wherein the BTSI pin assembly moves between the extended position when the solenoid is de-energized and the retracted position when the solenoid is energized, wherein in the retracted position, the coupler engages the second radial engagement wall such that a gap is defined between a distal end of the solenoid pin and the solenoid coil housing.

11. The shifter assembly of claim 7 wherein the blocking pin extends along a blocking pin axis and the solenoid pin extends along a solenoid pin axis, wherein the coupler allows the pin assembly to successfully translate between the extended position and the retracted position despite the blocking pin and solenoid pin axes occupying a misaligned, non-coaxial position.

12. The shifter assembly of claim 7 wherein both of the blocking pin and the solenoid pin include a respective conical extension portion that mates with the coupler.

13. The shifter assembly of claim 12 wherein the body defines (i) a first female receiving cavity that receives the conical extension portion of the blocking pin; and (ii) a second female receiving cavity that receives the conical extension portion of the solenoid pin.

14. The shifter assembly of claim 1 wherein the blocking pin is formed of hardened metallic material and the solenoid pin is formed of non-hardened magnetic material.

15. A shifter system assembly for a steering column, the shifter system assembly comprising:
a shifter mechanism that receives a shift lever, the shifter mechanism selectively movable between a "Park" position and an out of "Park" position;
a brake transmission shift interface (BTSI) assembly comprising:
a BTSI pin assembly at least partially received by a BTSI housing portion, the BTSI pin assembly comprising:
a blocking pin;
a solenoid pin that is separate and distinct from the blocking pin; and
an elastomeric coupler that couples the blocking pin and the solenoid pin; and
a solenoid coil, wherein the BTSI pin assembly moves between an extended position and a retracted position, wherein (i) in the extended position, the blocking pin inhibits movement of the shifter mechanism out of the "Park" position and (ii) in the retracted position, the blocking pin allows movement of the shifter mechanism to the out of "Park" position; and
wherein the elastomeric coupler engages the BTSI housing portion in the extended and retracted positions providing a controlled soft impact surface and facilitating sound deadening properties.

16. The shifter assembly of claim 15 wherein the blocking pin is formed of hardened metallic material and the solenoid pin is formed of non-hardened magnetic material.

17. The shifter assembly of claim 15 wherein both of the blocking pin and the solenoid pin include a respective conical extension portion that mates with the coupler.

18. The shifter assembly of claim 17 wherein the body defines (i) a first female receiving cavity that receives the conical extension portion of the blocking pin; and (ii) a second female receiving cavity that receives the conical extension portion of the solenoid pin.

19. A shifter system assembly for a steering column, the shifter system assembly comprising:
a shifter mechanism that receives a shift lever, the shifter mechanism selectively movable between a "Park" position and an out of "Park" position;
a brake transmission shift interface (BTSI) assembly comprising:
a BTSI pin assembly comprising:
a blocking pin;
a solenoid pin that is separate and distinct from the blocking pin;
a coupler that couples the blocking pin and the solenoid pin, wherein the coupler includes a coupler body having an outer diameter greater than corresponding diameters of the blocking pin and the solenoid pin; and
a BTSI pin carrier that defines a first diameter that accommodates the blocking pin and a second diameter that accommodates the coupler, wherein the BTSI pin carrier includes a first radial engagement wall at a transition between the first and second diameters; and
a solenoid coil, wherein the BTSI pin assembly moves between an extended position and a retracted position, wherein (i) in the extended position, the blocking pin inhibits movement of the shifter mechanism out of the "Park" position and (ii) in the retracted position, the blocking pin allows movement of the shifter mechanism to the out of "Park" position.

20. The shifter system assembly of claim 19, further comprising a detent plate, wherein the blocking pin locates between the detent plate and a protrusion extending from the shifter mechanism, the blocking pin and detent plate configured to resist load from the shifter mechanism when the blocking pin is in the extended position.

* * * * *